Jan. 28, 1958  G. S. TOOKE  2,821,642

BRUSH HOLDERS FOR DYNAMO ELECTRIC MACHINES

Filed June 18, 1956

Inventor
G. S. Tooke

United States Patent Office 2,821,642
Patented Jan. 28, 1958

2,821,642

BRUSH HOLDERS FOR DYNAMO ELECTRIC MACHINES

George Sydney Tooke, Edgbaston, Birmingham, England, assignor to Joseph Lucas (Industries) Limited, Birmingham, England Application June 18, 1956, Serial No. 592,117

Claims priority, application Great Britain June 23, 1955

1 Claim. (Cl. 310—246)

This invention relates to holders for commutator or slip-ring brushes for dynamo-electric machines, the object of the invention being to provide a holder in a form which enables it to be attached to its support in a simple and expeditious manner.

A holder in accordance with the invention comprises a pair of toggle-like links one of which is adapted to carry a brush, and a spring or springs acting on the links, the holder being adapted to be secured to a support by engagement therewith under the action of the spring or springs.

Figure 1:
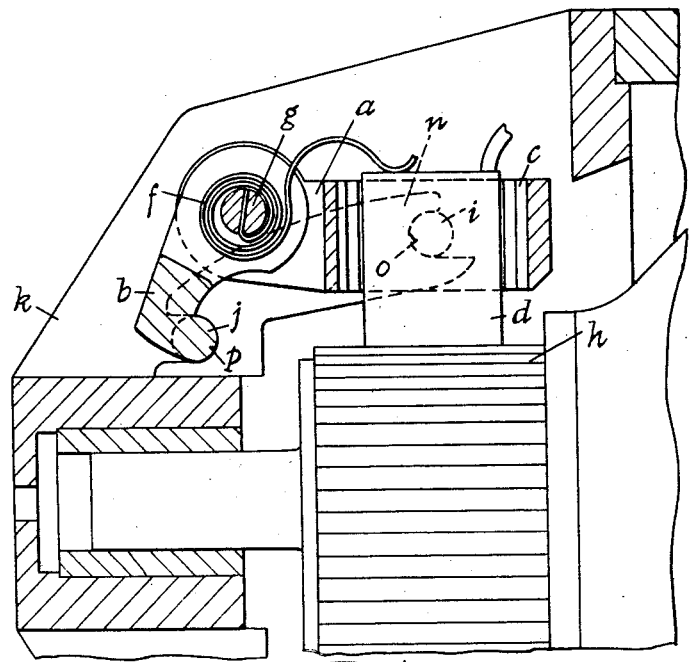
Figure 2:
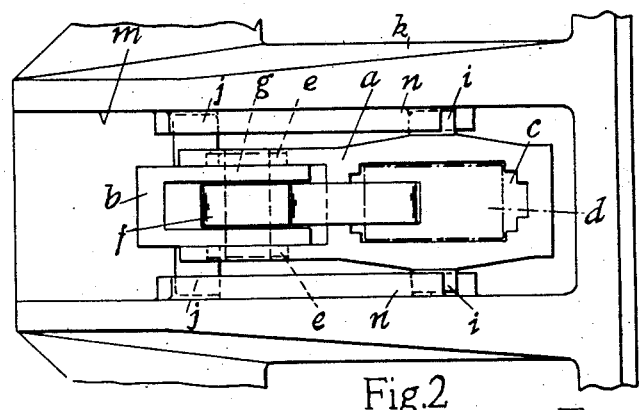

In the accompanying drawings, Figure 1 is a sectional side elevation and Figure 2 a plan illustrating a brush holder in accordance with the invention for use on a dyano-electric machine.

Referring to the drawings, the brush holder there shown comprises a pair of toggle-like links $a$, $b$ which are pivotally connected together at one end. One end of the link $a$ is shaped in the form of a socket $c$ for reception of a carbon or other brush $d$. Each link is forked at one end, and the forked end of the link $b$ is adapted to lie within the forked end of the link $a$. Pivotal connection between the links is effected by short trunnions $e$ on the link $b$ which occupy holes in the link $a$. Within the forked end of the link $b$ is placed a spirally coiled spring $f$ which is held in position by a pin $g$ inserted through the forked ends of the links coaxially with the trunnions $e$ and secured near its ends to the adjacent parts of the link $b$, one end of the spring being secured to the pin, and the other end of the spring being extended so that it can press on the outer end of the brush $d$ for holding the latter in contact with the commutator $h$ (or a slip ring) of the machine (which may be a dynamo or motor). The action of the spring on the links is such as will tend to move their free ends towards each other. This action takes place irrespective of whether the brush is present or removed, even though the brush is freely slidable in the socket $c$. Thus, when the brush is present the action of the spring is caused by the reaction of the brush to the spring pressure exerted on it, and when the brush is removed the spring bears on the link $a$. In an alternative arrangement, a helical tension spring or springs may be attached at its or their ends to the links.

At each side of the link $a$ are provided a pair of lateral projections $i$ of cylindrical form, and a similar pair of projections $j$ are provided at the free end of the link $b$.

For supporting the holder there is provided in the end cover $k$ of the machine adjacent to the commutator (or slip-ring) an open channel $m$ having a pair of parallel side walls, and on each wall is formed or secured a narrow ramp $n$ which terminates at one end in a notch $o$ and at the other end in a notch $p$, the upper edges of the ramps being such that the projections $i$ on the link $a$ can slide along them. To place the holder in position it is first slid into the said channel to bring the projections $j$ on the rear link $b$ into engagement with the notches $p$ at the approach ends of the ramps, and the projections $i$ on the brush-carrying link $a$ into contact with the edges of the ramps. A push exerted on the hinged ends of the links then causes the projections $i$ to slide along the said edges and also causes the angle between the links to be enlarged. In this action the spring is strained, and when the projections $i$ on the link $a$ reach the other ends of the ramps, the spring $f$ snaps them into engagement with the notches $o$, the holder being thereby securely fastened in position by the grip of the links on the ramps under the force exerted by the spring. If it is required at any time to remove the holder, it can be released by exerting on the hinged ends of the links sufficient force in opposition to the spring to release the projections from the notches.

It will be understood that where two or more holders are used on the same machine, the latter is provided with a corresponding number of holder supports.

By this invention a holder is provided in a form which enables it to be mounted in position in an expeditious manner, this being particularly advantageous in the bulk manufacture of dynamo-electric machines.

Having thus described my invention what I claim as new and desire to secure by Letters Patent is:

A dynamo electric machine brush holder and supporting means therefor, comprising in combination a pair of toggle-like links having adjacent forked ends pivotally connected together, at least one spring acting on the links to urge the other ends thereof towards each other, one of the links being provided with a brush-receiving socket, a pair of lateral projections on each link, and a support having thereon a pair of ramps provided at their ends with recesses for accommodating the lateral projections on the links, the projections on one of the links being initially engageable with the recesses at one end of the ramps, and the projections on the other link being then slidable along the ramps under pressure exerted on the pivotally interconnected ends of the links to stress the spring until the last mentioned projections are caused by the spring to engage the recesses at the other end of the ramps.

References Cited in the file of this patent

UNITED STATES PATENTS

| 1,798,394 | Angus | Mar. 31, 1931 |
| 2,356,105 | Uhler | Aug. 15, 1944 |

FOREIGN PATENTS

| 378,203 | Germany | July 6, 1923 |